US012810872B2

(12) United States Patent
Riaz

(10) Patent No.: US 12,810,872 B2
(45) Date of Patent: Nov. 24, 2026

(54) METHOD AND SYSTEM FOR CONCEALING PACKET LOSS IN A COMMUNICATION SYSTEM

(71) Applicant: SEMICONDUCTOR COMPONENTS INDUSTRIES, LLC, Scottsdale, AZ (US)

(72) Inventor: Areeb Riaz, Milton (CA)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 95 days.

(21) Appl. No.: 18/926,782

(22) Filed: Oct. 25, 2024

(65) Prior Publication Data

US 2025/0391413 A1 Dec. 25, 2025

Related U.S. Application Data

(60) Provisional application No. 63/661,723, filed on Jun. 19, 2024.

(51) Int. Cl.

| | |
|---|---|
| ***G10L 19/005*** | (2013.01) |
| ***H04L 43/0829*** | (2022.01) |
| ***H04L 65/80*** | (2022.01) |
| ***H04W 24/04*** | (2009.01) |
| ***H04W 28/04*** | (2009.01) |

(52) U.S. Cl.
CPC ........ *G10L 19/005* (2013.01); *H04L 43/0829* (2013.01); *H04L 65/80* (2013.01); *H04W 24/04* (2013.01); *H04W 28/04* (2013.01)

(58) Field of Classification Search
CPC ... G10L 19/005; H04L 1/0057; H04L 1/0071; H04L 43/0829; H04L 65/80; H04W 24/04; H04W 28/04
See application file for complete search history.

(56) References Cited

U.S. PATENT DOCUMENTS

| | | | | |
|---|---|---|---|---|
| 7,061,912 B1 * | 6/2006 | Anandakumar | ...... G10L 19/005 370/465 |
| 2005/0044471 A1 | 2/2005 | Chia | |

(Continued)

FOREIGN PATENT DOCUMENTS

| | | | |
|---|---|---|---|
| DE | 69928682 | T2 | 7/2006 |
| DE | 102007018484 | A1 | 9/2008 |
| WO | 2024251636 | A1 | 12/2024 |

*Primary Examiner* — Shelly A Chase
(74) *Attorney, Agent, or Firm* — Marton Ribera Schumann & Chang LLP

(57) ABSTRACT

A method is disclosed. The method includes receiving a sequence of encoded data packets, storing valid packets from the sequence of encoded data packets in a history buffer, and detecting an invalid packet in the sequence of encoded data packets. The method further includes comparing a template-data block preceding the invalid packet to a plurality of data blocks stored in the history buffer to identify a closest-matching data block in the history buffer. In addition, the method includes generating a replacement block based on a first data block following the closest-matching data block and storing the replacement block in place of the invalid packet in the history buffer. The method further includes decoding data, including the valid packets and the replacement block, with a decoder.

20 Claims, 12 Drawing Sheets

(56) References Cited

U.S. PATENT DOCUMENTS

| | | | | |
|---|---|---|---|---|
| 2009/0281797 | A1* | 11/2009 | Zopf | G10L 19/005 704/207 |
| 2010/0324911 | A1* | 12/2010 | Jougit | G10L 19/005 704/E21.001 |
| 2011/0196673 | A1 | 8/2011 | Sharma | |
| 2018/0350373 | A1* | 12/2018 | Park | G10L 19/005 |

* cited by examiner

METHOD AND SYSTEM FOR CONCEALING PACKET LOSS IN A COMMUNICATION SYSTEM

This application claims the benefit of provisional patent application No. 63/661,723, filed Jun. 19, 2024, which is hereby incorporated by reference herein in its entirety.

TECHNICAL FIELD

The disclosure relates generally to communication systems, and particularly to packet loss concealment in communication systems.

BACKGROUND

In wireless communications systems, packets of information representing audio sound may be sent from one computing device to another computing device. For example, in the context of hearing aids or headsets, packets of encoded audio signals may be sent over a wireless communications link, such as a Bluetooth connection, from a sending device such as a mobile phone or tablet to a receiving device such as the hearing aid or the headset. The packets may be decoded by the receiving device, after which the receiving device may output a replication of the audio signal.

The inventor of embodiments of the present disclosure has recognized that loss of packets between the sending device and the receiving device may result in distortion of the audio signal decoded and output by the receiving device. The inventor of embodiments of the present disclosure has also recognized that the loss of packets between the sending device and the receiving device may result in the loss of an internal state of the decoder in the receiving device. For example, decoders in some communications systems, such as Continuously Variable Slope Delta Modulation (CVSD or CVSDM) decoders, may rely on the received bit stream to maintain the internal state of the decoder. Embodiments of the present disclosure may address one or more of these challenges.

BRIEF DESCRIPTION OF THE DRAWINGS

A more complete understanding of the present embodiments may be acquired by referring to the following description taken in conjunction with the accompanying drawings, in which like reference numbers indicate like features.

DETAILED DESCRIPTION

Details of one or more embodiments are set forth in the description below and the accompanying drawings. Other features will be apparent from the description, drawings, and from the claims. The embodiments disclosed should not be interpreted, or otherwise used, as limiting the scope of the disclosure, including the claims. In addition, one skilled in the art understands that the following description has broad application, and the discussion of any embodiment is meant to be exemplary of that embodiment, and not intended to intimate that the scope of the disclosure, including the claims, is limited to that embodiment.

Figure 1A:
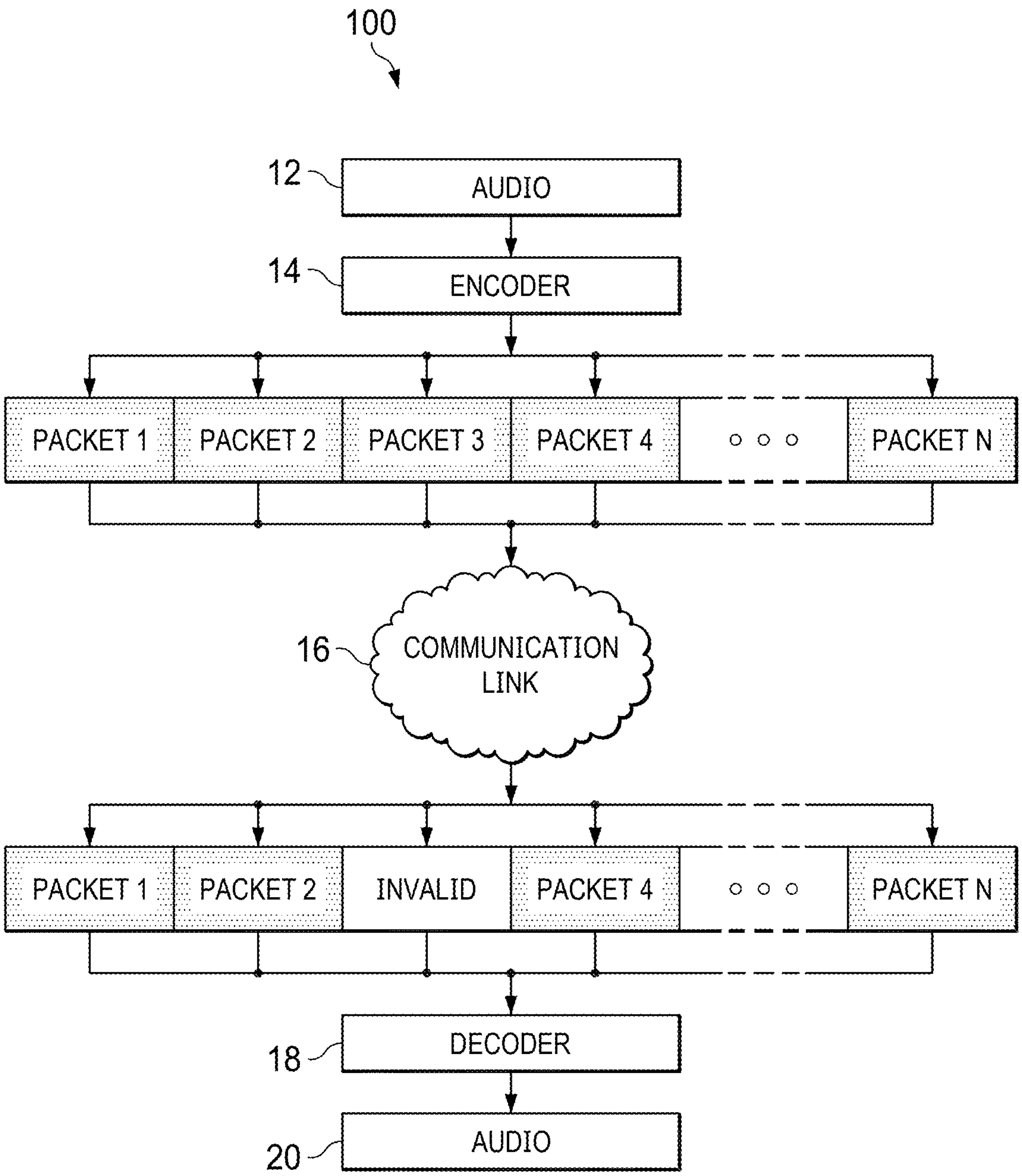
FIG. 1A illustrates a flow diagram for an audio signal in communication system in accordance with embodiments of the present disclosure.
Figure 1B:
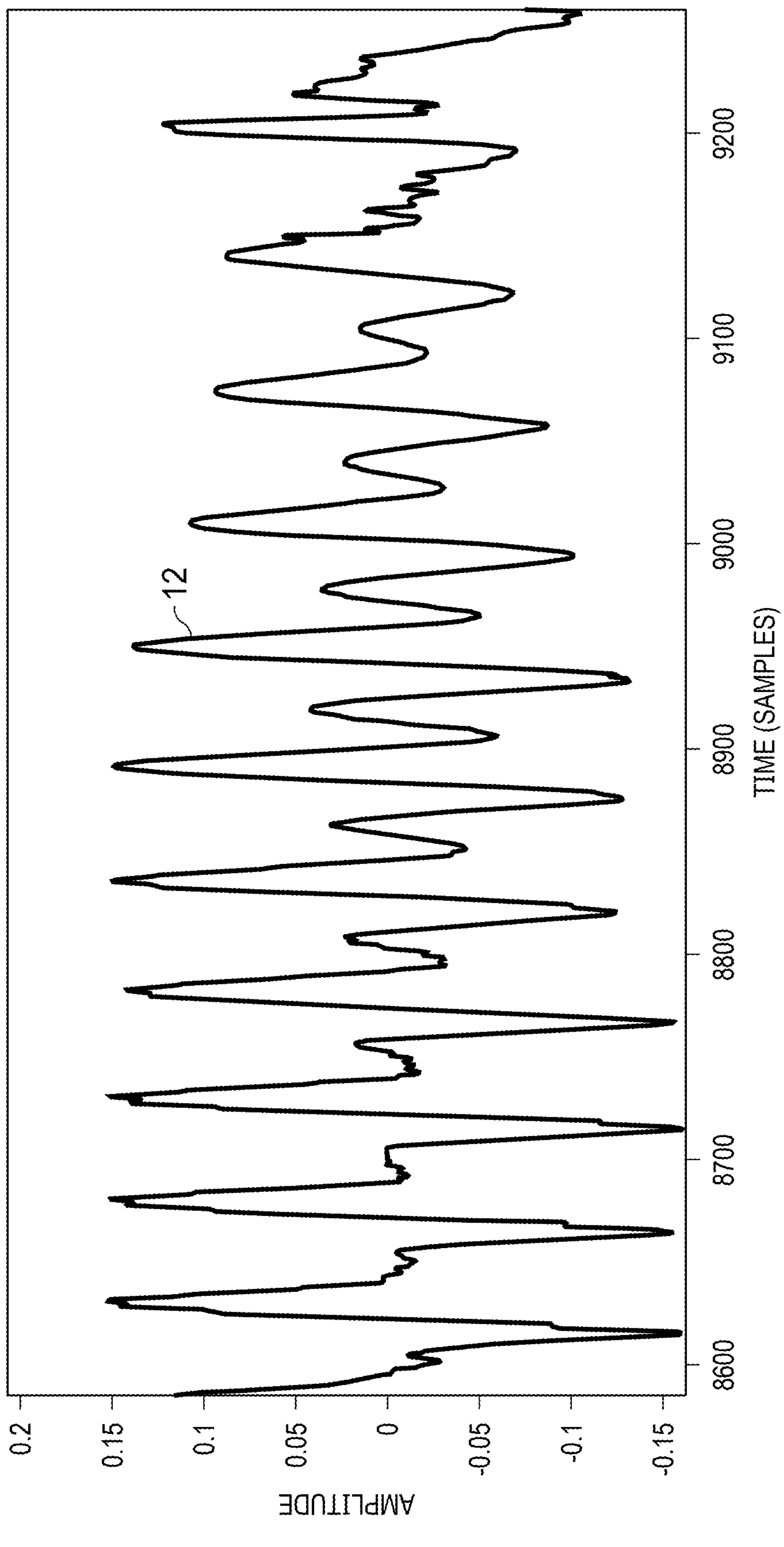
FIG. 1B illustrates an exemplary audio signal as initially captured by a communication system in accordance with embodiments of the present disclosure.
Figure 1C:
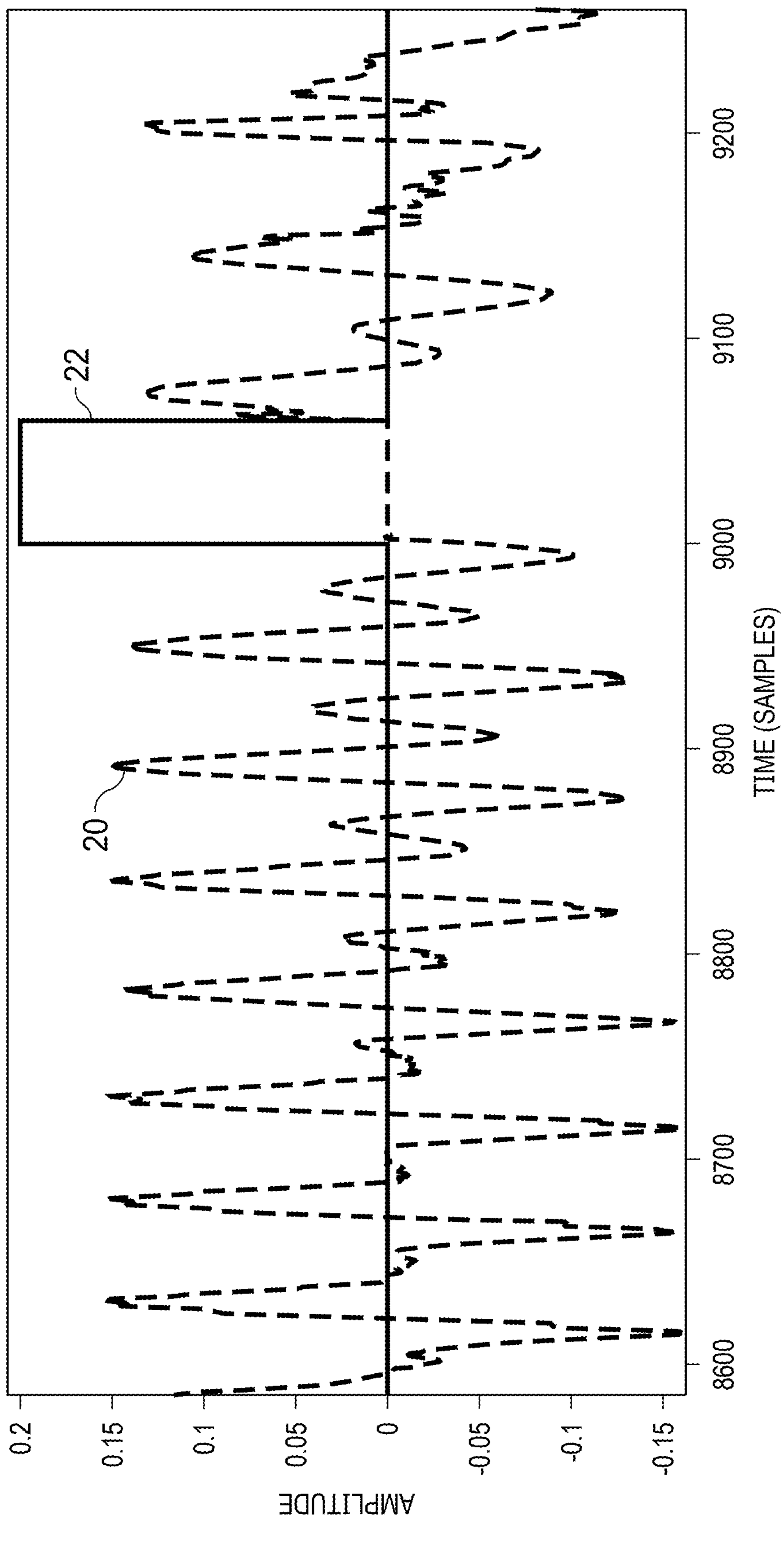
FIG. 1C illustrates an exemplary audio signal as reproduced and output by a communication system in accordance with embodiments of the present disclosure.

FIG. 1A illustrates a flow diagram for an audio signal in communication system 100. FIG. 1B illustrates audio signal 12 as initially captured by communication system 100. FIG. 1C illustrates audio output signal 20 as reproduced and output by communication system 100.

As shown in FIG. 1A, audio signal 12 may be captured by communication system 100. For example, audio signal 12 may represent a voice signal received by communication system 100 from a source such as a speaking person. As shown in FIG. 1B, audio signal 12 may have a varying amplitude over a sequence of time in the time domain. Referring back to FIG. 1A, the audio signal may be digitized and encoded by encoder 14. Encoder 14 may include, for example, a processor, a microprocessor, a digital signal processor (DSP), a microcontroller, or any other controller or device or combination of devices suitable to sample the audio signal 12, digitize the sampled signal, and encode the sample signal. After audio signal 12 is encoded, the encoded audio data may be arranged in packets of data for transmission over communication link 16. The encoded audio signal may be arranged in any suitable N number of packets according to the amount of audio data to be sent. For example, as shown in FIG. 1A, Packet 1, Packet 2, Packet 3, Packet 4, through Packet N may be prepared for communication across communication link 16. In some embodiments, communication link 16 may be a wireless communication link, such as a Bluetooth communication link.

As shown in FIG. 1A, the packets of audio data may be transmitted across communication link 16 and received by a receiving device at decoder 18. Decoder 18 may decode the encoded audio data and output a replicated audio signal in the form of audio output signal 20. Decoder 18 may be implemented by, for example, a processor, a microprocessor, a digital signal processor (DSP), a microcontroller, or any other controller or device or combination of devices suitable to receive and decode the encoded audio data and to generate audio output signal 20. During transmission across communication link 16, some number of packets may be lost as illustrated by Packet 3 in FIG. 1A. The loss of one or more packets may result in the loss of audio output signal 20 during a packet-loss period 22 corresponding to the lost audio data.

In some embodiments, encoder 14 and decoder 18 of communication system 100 may use Continuously Variable Slope Delta Modulation (CVSD or CVSDM) to respectively encode and then decode an audio signal. When employing CVSD, an audio signal in the time domain, such as audio signal 12, may be encoded as 1 bit per sample at a sampling rate of 64 KHz. The encoded audio data may thus be a 64 kbit/s audio data signal. The encoder, such as encoder 14, may also maintain a reference sample and a step size for comparison to the sampled signal. If the sampled signal has a larger amplitude than the reference sample, the encoded data is noted as a Logic 1 and the step size is added. Conversely, if the sample signal has a smaller amplitude than the reference sample, the encoded data is noted as a Logic 0 and the step size is subtracted. The adjustments to the step size are thus the result of the encoder tracking the previous number of bits earlier encoded. Subsequently, the decoder, such as decoder 18, may perform the reverse logic to reconstruct audio signal from the encoded audio data. Because the reference sample is dependent on previous samples, a lost or otherwise invalid data packet may result in an incorrect internal state of the decoder. Thus, due to the incorrect internal state of the decoder, the distortion caused by an invalid data packet may persist beyond the time period corresponding to the invalid data packet itself. As described in further detail below with reference to FIGS. 2-8, a communication system in accordance with embodiments of the present disclosure may include a packet-loss concealment (PLC) circuit configured to replace the invalid packet in the encoded domain prior to the decoder. Accordingly, the state of the decoder may be maintained in the event of a lost or otherwise invalid packet and the distortion perceived by an end user may be reduced or eliminated.

Figure 2:
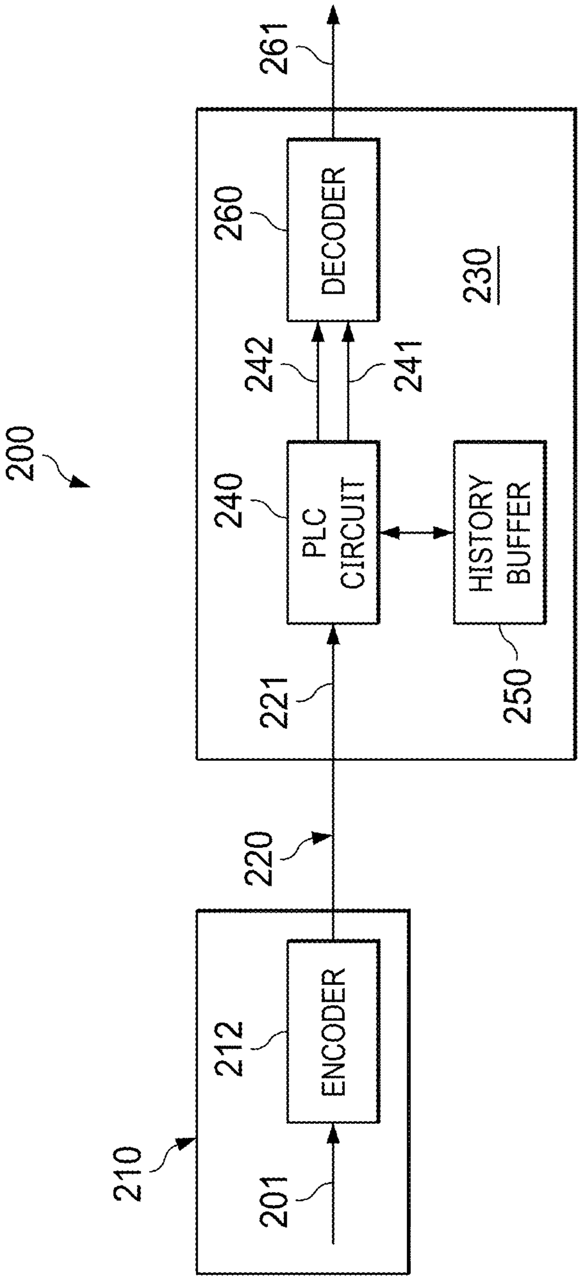
FIG. 2 illustrates a block diagram of an exemplary communication system in accordance with embodiments of the present disclosure.

FIG. 2 illustrates a block diagram of communication system 200 in accordance with embodiments of the present disclosure. Communication system may include sending device 210, communication link 220, and receiving device 230. Sending device 210 may be, for example, a mobile phone or a tablet. In some embodiments, receiving device 230 may be for example a hearing aid or a headset. As described in further detail below, sending device 210 may send packets of encoded audio data over communication link 220 to receiving device 230.

Sending device 210 may be implemented in any suitable fashion according to the operation described in the present disclosure. In some embodiments, sending device 210 may include encoder 212. The components of sending device 210, including encoder 212, may be implemented for example, with a processor, a microprocessor, a digital signal processor (DSP), a microcontroller, or any other controller or device or combination of devices suitable to sample the audio signal 201, digitize the sampled signal, and encode the sampled signal to generate encoded audio data 221. Further, in some embodiments, at least one non-transitory computer-readable storage medium may be provided comprising instructions stored thereon that, when executed by at least one processor of a device, such as sending device 210, may cause the device to perform operations, as described herein with reference to encoder 212.

In some embodiments, encoder 212 may be a CVSD encoder. Encoder 212 may digitize and encode audio signal 201 to generate encoded audio data 221. Employing CVSD, for example, audio signal 201 may be encoded as 1 bit per sample at a sampling rate of 64 KHz. The encoded audio data 221 may thus be a 64 kbit/s audio data signal. Each encoded data bit may represent one decoded sample at 64 KHz. Thus, 30 milliseconds of samples in the time domain may include sixty 32-bit integers, or 240 bytes, in the encoded domain.

Encoder 212 may maintain a reference sample and a step size for comparison to the sampled signal. If the sampled signal has a larger amplitude than the reference sample, the encoded data is noted as a Logic 1 and the step size is added. Conversely, if the sample signal has a smaller amplitude than the reference sample, the encoded data is noted as a Logic 0 and the step size is subtracted. The adjustments to the step size are thus the result of encoder 212 tracking the previous number of bits earlier encoded.

Figure 3A:
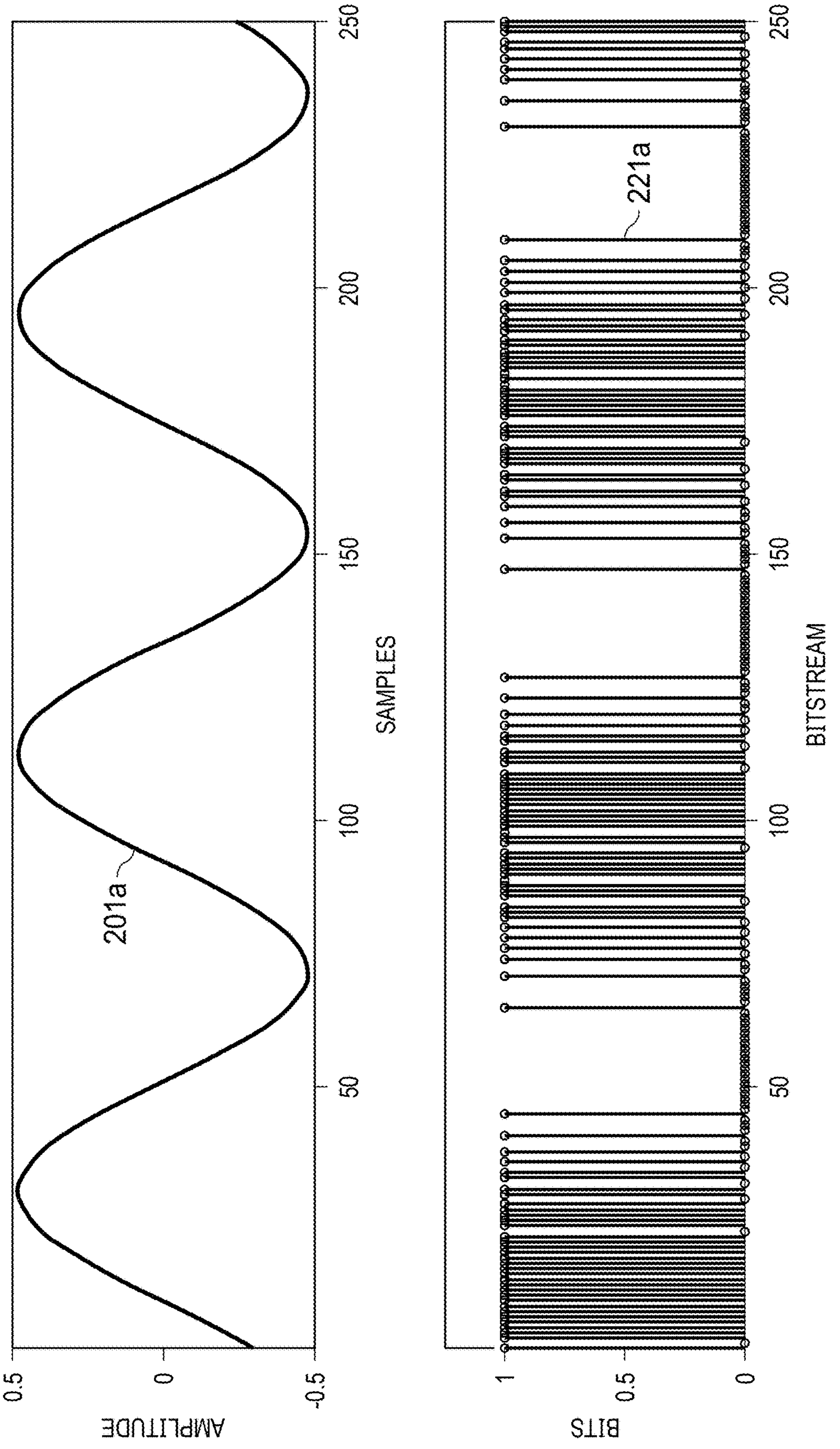
FIGS. 3A and 3B illustrate example waveforms of an audio signal and encoded audio data in accordance with embodiments of the present disclosure.
Figure 3B:
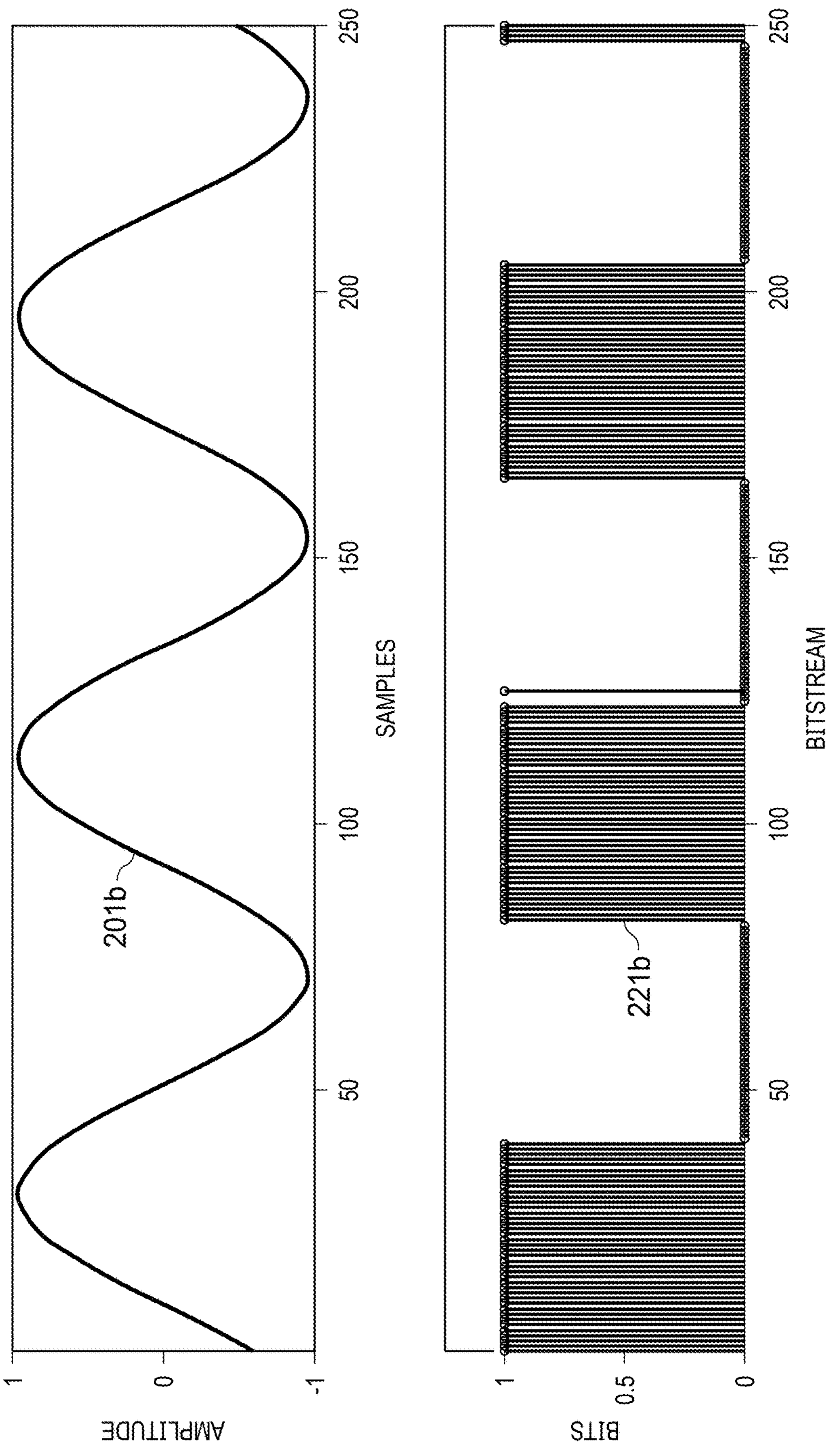

FIGS. 3A and 3B illustrate example waveforms of an audio signal and encoded audio data in accordance with embodiments of the present disclosure. Specifically, FIG. 3A illustrates an audio signal 201*a* having an amplitude of −0.5 to 0.5 over the course of 250 samples in the time domain, as well as the resulting encoded audio data 221*a* in the encoded domain. FIG. 3B illustrates an audio signal 201*b* having an amplitude of −1.0 to 1.0 over the course of 250 samples in the time domain, as well as the resulting encoded audio data 221*b* in the encoded domain. Audio signals 201*a* and 201*b* may represent embodiments of audio signal 201 described above with reference to FIG. 2. Likewise, encoded audio data 221*a* and 221*b* may represent embodiments of encoded audio data 221 described above with reference to FIG. 2.

Referring back to FIG. 2, encoded audio data 221 may be transmitted from sending device 210 to receiving device 230 via communications link 220. Communication link 220 may be a wireless communication link, such as a Bluetooth communication link.

Receiving device 230 may be implemented in any suitable fashion according to the operation described in the present disclosure. In some embodiments, receiving device 230 may include PLC circuit 240, history buffer 250, and decoder 260. The components of receiving device 230, including PLC circuit 240, history buffer 250, and decoder 260, may be implemented for example, with a processor, a microprocessor, a digital signal processor (DSP), a microcontroller, or any other controller or device or combination of devices suitable to receive and decode the encoded audio data 221 and to generate audio output signal 261. Further, in some embodiments, at least one non-transitory computer-readable storage medium may be provided comprising instructions stored thereon that, when executed by at least one processor of a device such as receiving device 230, may cause the device to perform operations, as described below with reference to PLC circuit 240, history buffer 250, and decoder 260.

As described in further detail below with reference to FIG. 4, PLC circuit 240, history buffer 250, and decoder 260 may operate in conjunction to conceal the loss of packets that may have occurred during transmission across communication link 220. PLC circuit 240 may be coupled to history buffer 250. In some embodiments, PLC circuit 240 may maintain a history of received packets in history buffer 250. For example, PLC circuit 240 may be configured to store valid packets, from a sequence of encoded data packets forming encoded audio data 221, to history buffer 250. In some embodiments, history buffer 250 may be a first-in first-out (FIFO) buffer that stores a history of 10, 20, 30, 40, or more, milliseconds worth of the most recently received packets, and thus the bit stream defined therein. By storing encoded data, history buffer 250 may be implemented with a smaller memory than if decoded data were stored in a history buffer. For example, 30 milliseconds worth of data encoded at 64 Kbits/s may result in sixty 32-bit integers or 240 bytes of data in the encoded domain to be stored in history buffer 250. On the other hand, 30 milliseconds worth of decoded data would consume 1920 bytes of memory assuming a 16 KHz sampling rate, or 960 bytes of memory assuming a 8 KHz sampling rate. The size and cost of the memory used to implement history buffer 250 is thus improved by storing encoded data, as opposed to decoded data, in history buffer 250.

When one or two packets are detected to be invalid, PLC circuit 240 may operate to replace those invalid packets with replacement blocks based on encoded data that was previously received and stored in history buffer 250. The replacement blocks may be forwarded to decoder 260 as part of encoded audio data 241. Decoder may be coupled to PLC circuit 240 and may be configured to receive encoded audio data 241 from PLC circuit 240. Decoder 260 may then decode the encoded audio data 241, including valid packets and the replacement blocks, and thereby generate audio output signal 261. In some embodiments, decoder 260 may be a CVSD decoder. The internal state of the CVSD decoder may be updated based on the valid packets and a replacement block or multiple replacement blocks. Specifically, the CVSD decoder may be configured to update an internal state of the CVSD decoder based on the valid packets and a replacement block or multiple replacement blocks. Because the internal state of the decoder may be updated based on one or more replacement blocks of encoded data, the packet loss concealment techniques disclosed herein may avoid the need to store the internal state of the decoder. Thus, the size and cost of the memory to implement a history buffer such as history buffer 250 may be improved not only by storing encoded data as opposed to decoded data, but by also avoiding the need to store a history of the internal states of the decoder.

As also described below with reference to FIG. 4, PLC circuit 240 may in some embodiments also provide a gain variable 242 to instruct decoder 260 to either ramp down the gain of decoder 260 based on the determination that multiple consecutive packets were invalid, or alternatively to ramp up the gain of decoder 260 based on the determination that, following two or more invalid packets, a new valid packet has been received.

Figure 4:
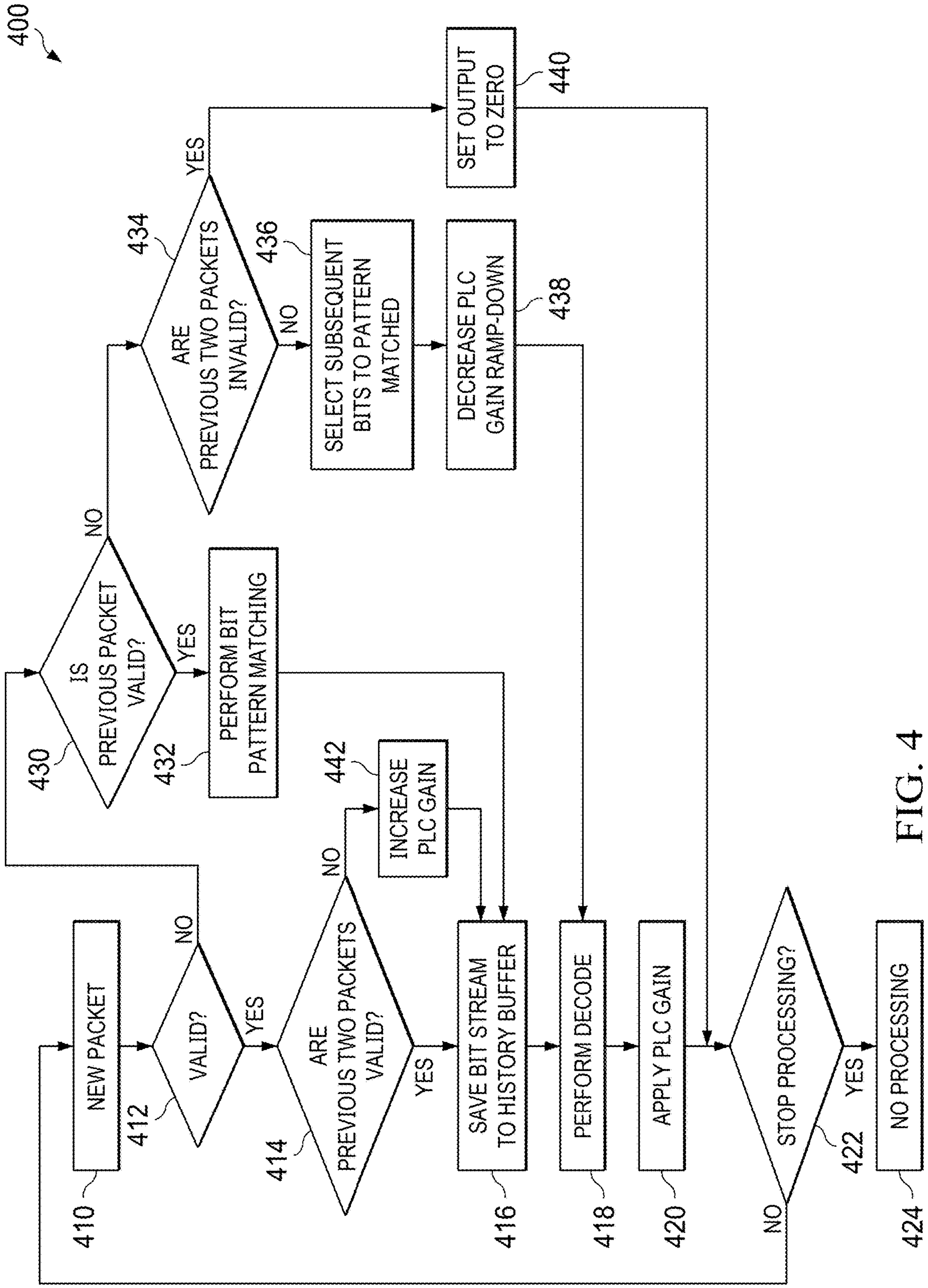
FIG. 4 illustrates an exemplary flow for processing encoded audio data in accordance with embodiments of the present disclosure.

FIG. 4 illustrates a flow 400 for processing encoded audio data in accordance with embodiments of the present disclosure. The steps of flow 400 may be performed by any suitable mechanism, such as the components of receiving device 230 described above with reference to FIG. 2, including PLC circuit 240, history buffer 250, and/or decoder 260, or any suitable combination thereof. In some embodiments, the steps of flow 400 may be performed with fewer or more steps than shown in FIG. 4. Moreover, in some embodiments, certain steps of flow 400 may be omitted, repeated, performed in parallel, performed in a different order than shown in FIG. 4, or performed recursively. Moreover, one or more steps of flow 400, although shown in an order, may be performed at the same time or in a re-ordered manner.

Step 410 may include receiving a new packet. For example, at step 410, PLC circuit 240 may receive a new packet from within a sequence of encoded data packets forming encoded audio data 221.

Step 412 may include detecting whether the new packet is valid or not. In some embodiments, PLC circuit 240 may detect whether the new packet is valid or not based on a flag. For example, in embodiments where receiving device 230 is included in a Bluetooth application, PLC circuit 240, history buffer 250, and decoder 260 may reside in the Application Layer of the Bluetooth protocol stack. In such embodiments, PLC circuit 240 may receive a flag from lower layers of the Bluetooth protocol stack indicating the validity or invalidity of any packet passed to PLC circuit 240. Accordingly, PLC circuit 240 may detect the validity or invalidity of any received packet based on the status of the associated flag. If the newly received packet is valid, flow 400 may proceed to step 414.

Step 414 may include determining whether the previous two consecutively-received packets were valid or invalid. For example, PLC circuit 240 may maintain a validity log tracking the validity of received packets. Upon detecting that a newly received packet is valid in step 412, PLC circuit 240 may, in step 414, reference the validity log to determine whether the previous two consecutively-received packets were valid or invalid. If PLC circuit 240 determines that the previous two consecutively-received packets were valid, flow 400 may proceed to step 416.

Step 416 may include saving the bit stream defined by the newly received packet to memory in history buffer 250. For example, as described above with reference to FIG. 2, PLC circuit 240 may be configured to store valid packets, from a sequence of encoded data packets, to history buffer 250. The saved bit stream defined by the newly received packet may also be sent from history buffer 250 to decoder 260, and flow 400 may proceed to step 418 and then to step 420.

Step 418 may include decoding the bit stream defined by the newly received packet. And step 420 may include applying the appropriate gain to the decoded signal. For example, decoder 260 may receive the bit stream defined by the newly received packet as part of encoded audio data 241. Decoder 260 may then decode the encoded audio data 241 using the reverse logic of encoder 212 to reconstruct an audio signal from encoded audio data 241. For example, in embodiments where encoder 212 is a CVSD encoder, decoder 260 may be a CVSD decoder utilizing the reverse CVSD logic to generate audio output signal 261 based on encoded audio data 241. Moreover, decoder 260 may apply the appropriate level of gain when generating audio output signal 261. For example, as described below with reference to steps 438 and 442, the gain of decoder 260 may be adjusted up or down depending on the validity of different consecutively received packets to ramp up or ramp down the volume at which audio output signal 261 may be output to a user.

Moving to step 422, flow 400 may include determining whether to proceed by processing more packets. For example, if PLC circuit 240 does not receive further packets, flow 400 may proceed to step 424 where no further processing of packets is conducted. Conversely, if PLC circuit 240 does receive further packets, flow 400 may revert back to step 410 where the steps of flow 400 may be repeated.

Reverting back to step 410, another new packet may be received. For example, at step 410, PLC circuit 240 may receive another new packet from within a sequence of encoded data packets forming encoded audio data 221. Moving again to step 412, the validity of the most recently received packet may be detected. As described above with reference to step 412, PLC circuit 240 may receive a flag from lower layers of the Bluetooth protocol stack indicating the validity or invalidity of any packet passed to PLC circuit 240. Accordingly, PLC circuit 240 may detect the validity or invalidity of any received packet based on the status of the associated flag. If the most recently received packet is invalid, flow 400 may proceed to step 430.

Step 430 may include determining whether the previous packet was invalid. As described above, PLC circuit 240 may maintain a validity log tracking the validity of received packets. Upon detecting that a newly received packet is invalid in step 412, PLC circuit 240 may, in step 430, reference the validity log to determine whether the previous packet was valid or invalid. If PLC circuit 240 determines that the previous packet was valid, flow 400 may proceed to step 432. In other words, flow 400 may proceed to step 432 if it is detected in steps 412 and 430 that the most recently received packet is invalid, but the previously received packet (one prior to the most recently received packet) is valid.

Step 432 may include performing bit-pattern matching. As described above with reference to step 416, the bit stream defined by received valid packets may be saved to memory in history buffer 250. History buffer 250 may thus maintain a history of the received valid packets, and the bit stream defined therein, over a period of time. For example, history buffer 250 may maintain a history of 10, 20, 30, 40, or more, milliseconds worth of the most recently received packets, and thus the bit stream defined therein. Step 432 may include performing bit-pattern matching on this stored history. For example, as described in further detail below with reference to FIG. 5, PLC circuit 240 may use the data before the invalid packet as a template to identify a corresponding closest-matching data block, and then utilize the data following the closest-matching data block as a replacement for the invalid packet.

Figure 5:
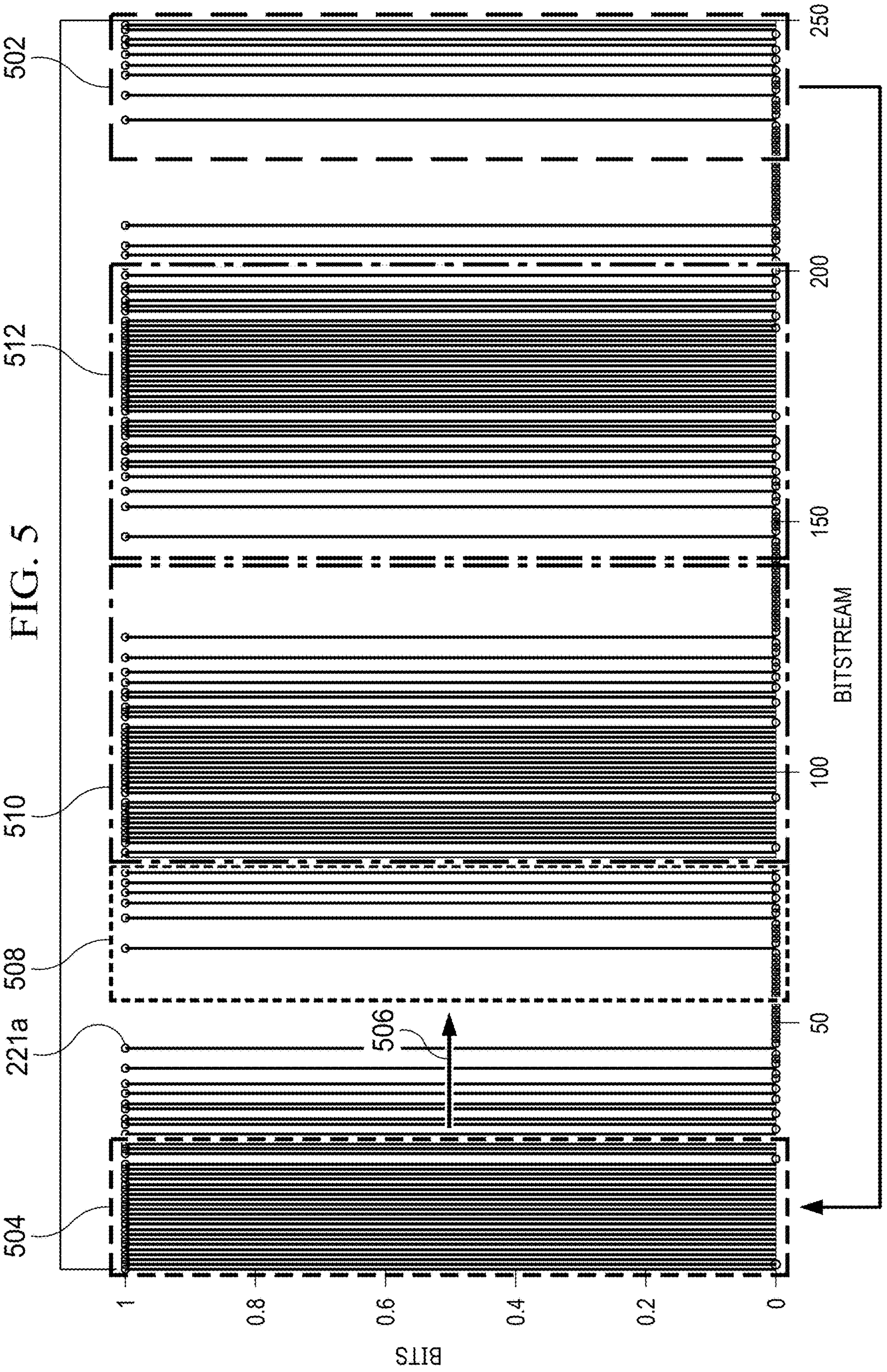
FIG. 5 illustrates an exemplary technique for performing bit-pattern matching in accordance with embodiments of the present disclosure.

FIG. 5 illustrates a technique for performing bit-pattern matching in accordance with embodiments of the present disclosure. FIG. 5 shows bit-pattern matching performed on, for example, valid packets of encoded audio data 221*a* stored in history buffer 250. Bit-pattern matching includes searching for replacement data for the invalid packet from among the data, including previously received valid packets, stored in history buffer 250.

The most recent data in history buffer 250 may include the bit pattern defined by the most recent valid packet or packets prior to a first invalid packet. A template-data block 502 may be identified from this most recent data in history buffer 250. For example, template-data block 502 may represent the most recently received 2, 3, 4, 5, 6, 7, 8, or more, milliseconds worth of data stored in history buffer 250 before the invalid packet. Template-data block 502 may then be compared to similar sized blocks of data in history buffer 250. For example, PLC circuit 240 may compare template-data block 502 with data block 504 at the beginning of history buffer 250, as well as subsequent data blocks 506 representing audio data later in time in history buffer 250. The step size to choose subsequent blocks of history data may be configurable. In some embodiments, steps of 8 bits may be utilized. In CVSD, 8 bits in the encoded domain represent one sample in the decoded time domain at 8 KHz. In other embodiments, other step sizes, such as 2 bits, 4 bits, 16 bits, 32 bits, 64 bits, or more, may instead be utilized, depending on the sample rate for encoding data. In some embodiments, the comparison may be performed by counting bits after performing an XNOR operation between the bits of template-data block 502 and the various data blocks stored in history buffer 250. In other embodiments, any other suitable similarity metrics may be utilized, such as cross correlation, sign correlation, or other techniques based on waveform differences. After template-data block 502 is compared block by block to the data in history buffer 250, including data block 504 and subsequent data blocks 506, a closest-matching data block 508 may be identified. Closest-matching data block 508 may be the data block with the highest similarity metric of the data blocks in history buffer 250 to which the template-data block 502 is compared. The first data block 510 following closest-matching data block 508 may then be tabbed as the replacement data for the invalid packet. Subsequently, a replacement block may be generated based on the first data block 510 following the closest-matching data block 508. For example, the first data block 510 may be copied to generate the replacement block. After first data block 510 has been identified by the bit-pattern matching as the replacement for the invalid packet, flow 400 may proceed to step 416, where PLC circuit 240 may save the replacement block to history buffer 250 in the place of the invalid packet. Flow 400 may then continue with steps 418 through 422 as described above.

Reverting back to step 410, a further new packet may be received. For example, at step 410, PLC circuit 240 may receive another new packet from within a sequence of encoded data packets forming encoded audio data 221. Moving again to step 412, the validity of the most recently received packet may be detected. As described above with reference to step 412, PLC circuit 240 may receive a flag from lower layers of the Bluetooth protocol stack indicating the validity or invalidity of any packet passed to PLC circuit 240. Accordingly, PLC circuit 240 may detect the validity or invalidity of any received packet based on the status of the associated flag. If the most recently received packet is flagged as invalid, flow 400 may proceed to step 430.

Step 430 may include determining whether the previous packet was invalid. As described above, PLC circuit 240 may maintain a validity log tracking the validity of received packets. Upon detecting that a newly received packet is invalid in step 412, PLC circuit 240 may, in step 430, reference the validity log to determine whether the previous packet was valid or invalid. If PLC circuit 240 determines that the previous packet was invalid, flow 400 may proceed to step 434.

Step 434 may include determining whether the two previous consecutively-received packets were invalid. For example, PLC circuit 240 may in step 434, reference the validity log to determine whether, in addition to the most recently received packet, the two previous consecutively-received packets were invalid. If the two previous consecutively-received packets were not invalid, flow 400 may proceed to step 436. In other words, if it is detected in steps 412, 430, and 434, that the most recently received packet is a second consecutive invalid packet following a first invalid packet, then flow 400 may proceed to step 436.

Step 436 may include selecting subsequent bits to those previously identified by the bit pattern matching. For example, referring back to FIG. 5, the second data block 512 following first data block 510 may be tabbed as the replacement data for the second consecutive invalid packet. Subsequently, a second replacement block may be generated based on the second data block 512 following the first data block 510. For example, the second data block 512 may be copied to generate the second replacement block. The second replacement block may then be forwarded by PLC circuit 240 to decoder 260 in place of the second consecutive invalid packet.

Step 438 may include decreasing the gain of decoder 260. For example, as described above with reference to FIG. 2, PLC circuit 240 may provide a gain variable 242 to instruct decoder 260 to ramp down its output gain based on the determination that multiple consecutive packets were invalid. After ramping down the gain of decoder 260, flow 400 may proceed to step 418. Flow 400 may then continue with steps 418 through 422 as described above.

Reverting back again to step 410, a further new packet may be received. For example, at step 410, PLC circuit 240 may receive a new packet from within a sequence of encoded data packets forming encoded audio data 221. Moving again to step 412, the validity of the most recently received packet may be detected. If the most recently received packet is flagged as invalid, flow 400 may proceed to step 430. As described above, step 430 may include determining whether the previous packet was invalid. PLC circuit 240 may maintain a validity log tracking the validity of received packets. Upon detecting that a newly received packet is invalid in step 412, PLC circuit 240 may, in step 430, reference the validity log to determine whether the previous packet was valid or invalid. If PLC circuit 240 determines that the previous packet was invalid, flow 400 may proceed to step 434. Step 434 may include determining whether the two previous consecutively-received packets were invalid. For example, PLC circuit 240 may reference the validity log to determine whether, in addition to the most recently received packet, the two previous consecutively-received packets were invalid. If the two previous consecutively-received packets were invalid, flow 400 may proceed to step 440. In other words, if it is detected in steps 412, 430, and 434, that the most recently received packet is a third consecutive invalid packet in the sequence of encoded data packets, flow 400 may proceed to step 440.

Step 440 may include setting the output gain of decoder 260 to zero. For example, if it is detected in steps 412, 430, and 434, that each of the most recently received packet and the previous two consecutively-received packet are all invalid, PLC circuit 240 may provide a gain variable 242 to instruct decoder 260 to decrease the output gain of decoder 260 to zero. The output of decoder 260 may thereby be muted. After step 440, flow 400 may proceed to step 422.

After the gain of decoder 260 has been ramped down in response to the detection of a second consecutive invalid packet, or set to zero in response to detection of a third consecutive invalid packet, later received valid packets may cause the gain of decoder 260 to be ramped up again, such that the output of decoder 260 is re-established with the receipt of additional new and valid packets. For example, if a new packet is received and detected to be valid at steps 410 and 412, flow 400 may proceed to step 414. As described above, step 414 may include determining whether the previous two consecutively-received packets were valid or invalid. For example, upon detecting that a newly received packet is valid in step 412, PLC circuit 240 may, in step 414, reference the validity log to determine whether the previous two consecutively-received packets were valid or invalid. If either of the previous two consecutively received packets were invalid, flow 400 may proceed to step 442 before proceeding to step 416. As described above with reference to FIG. 2, PLC circuit 240 may provide a gain variable 242 to instruct decoder 260 to either ramp down its output gain based on the determination that multiple consecutive packets were invalid, or alternatively to ramp up its output gain based on the determination that, following one or more invalid packets, one or more new valid packets have been received. Thus, upon the detecting in steps 412 and 414 that the most recently received packet is valid, and that one or both of the two previous consecutively-received packets were invalid, flow 400 may proceed to step 442 where the gain of decoder 260 may be ramped upward to its maximum value. Accordingly, as new valid packets are received, the output of decoder 260 may be re-established with an upward ramp up. As described in further detail below with reference to FIG. 7, the ramp-up time may be configured to occur within a time period that is less than the time period corresponding to the newly received valid data packet.

Figure 6:
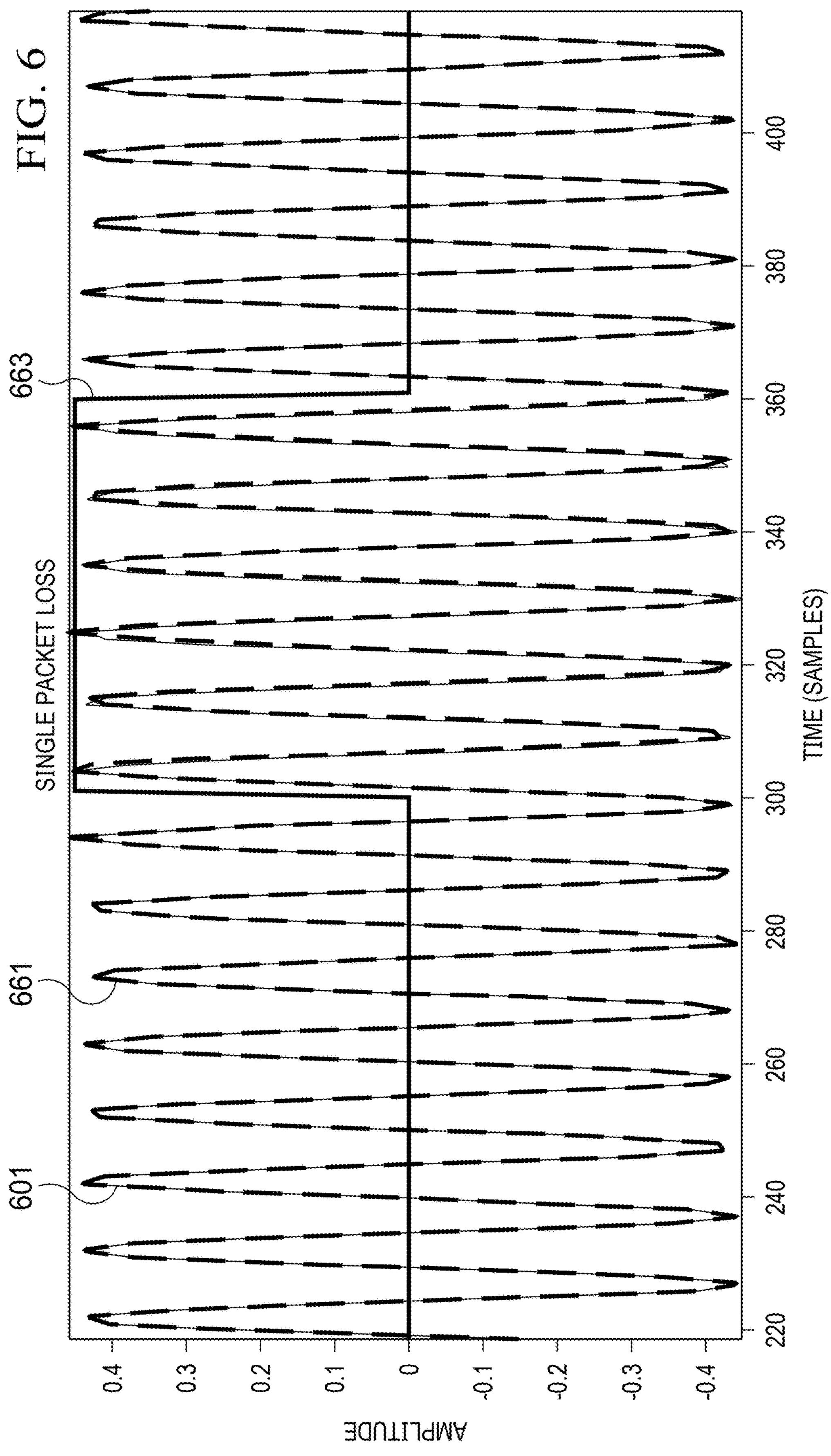
FIG. 6 illustrates exemplary waveforms of audio signals in accordance with embodiments of the present disclosure.

FIG. 6 illustrates exemplary waveforms of audio signals in accordance with embodiments of the present disclosure. Audio signal 601 may represent an embodiment of audio signal 201 captured by sending device 210 and encoded by encoder 212 as described above with reference to FIG. 2. Similarly, audio output signal 661 may represent an embodiment of audio output signal 261 generated by decoder 260 as described above with reference to FIG. 2. Packet loss flag 663 may indicate a period of time corresponding to a single lost or otherwise invalid packet of audio data transmitted for example, from sending device 210, across communication link 220, and to receiving device 230. As shown in FIG. 6, audio output signal 661 may closely match audio signal 601. During the time period of the single invalid packet, as indicated by packet loss flag 663, the receiving device 230 may conceal the loss of the single packet by following steps of flow 400. For example, as described above with reference to steps 412, 430, 432, 416, 418, 420, and 422, PLC circuit 240 may replace the data corresponding to the single invalid packet with data from history buffer 250. Decoder 260 may thus decode data, including valid packets and the replacement block forwarded to decoder 260 in place of the single invalid packet, to generate audio output signal 661.

Figure 7:
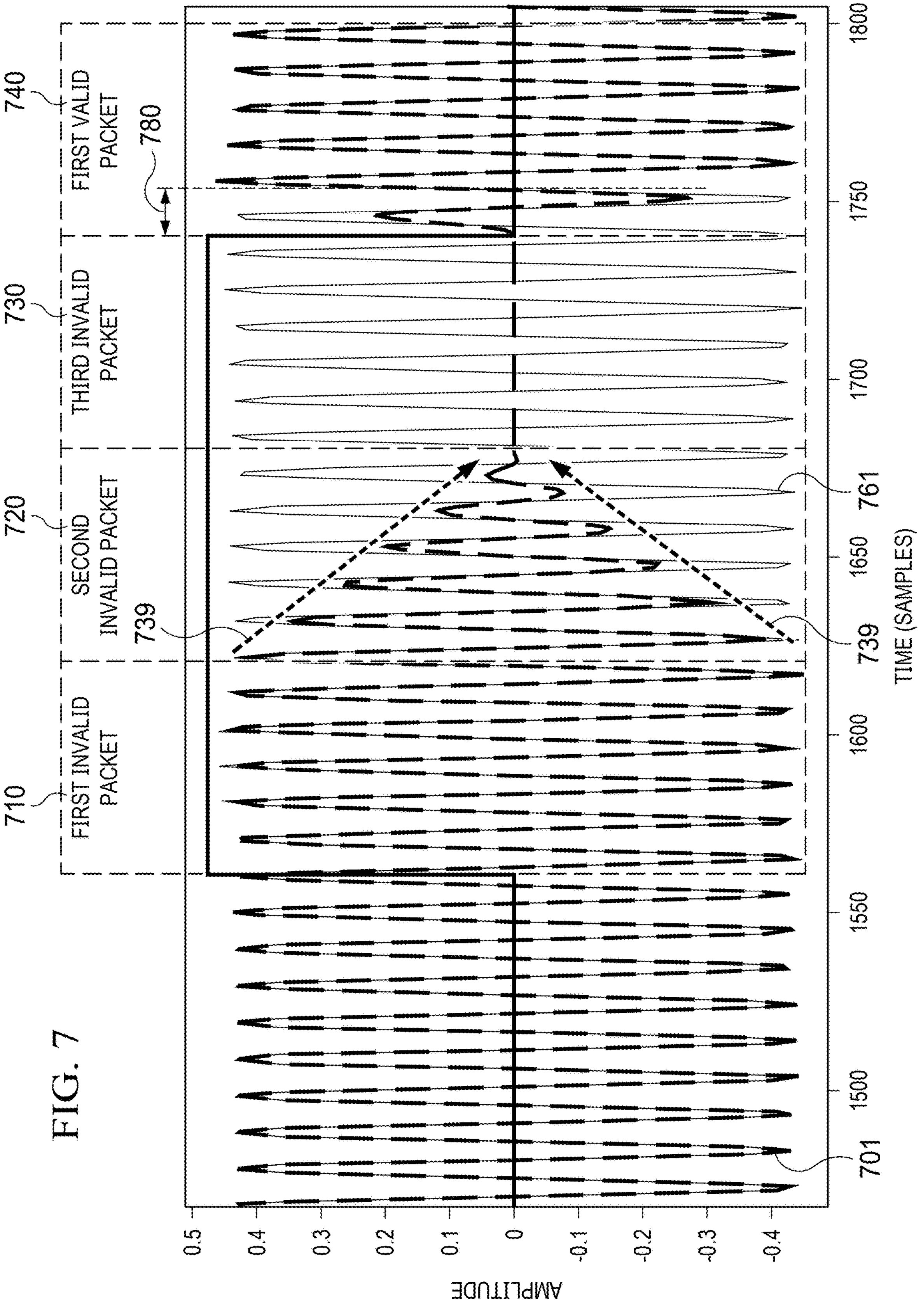
FIG. 7 illustrates exemplary waveforms of audio signals in accordance with embodiments of the present disclosure.

FIG. 7 illustrates exemplary waveforms of audio signals in accordance with embodiments of the present disclosure. Audio signal 701 may represent an embodiment of audio signal 201 captured by sending device 210 and encoded by encoder 212 as described above with reference to FIG. 2. Similarly, audio output signal 761 may represent an embodiment of audio output signal 261 generated by decoder 260 as described above with reference to FIG. 2. Time period 710 may correspond to the time period of a first invalid packet. Time period 720 may correspond to the time period of a second consecutive invalid packet. Time period 730 may correspond to the time period of a third consecutive invalid packet. And time period 740 may correspond to a first valid packet following the third consecutive invalid packet.

As shown in FIG. 7, the receiving device 230 may conceal the loss of the first packet corresponding to time period 710 by following steps of flow 400. For example, as described above with reference to steps 412, 430, 432, 416, 418, 420, and 422, PLC circuit 240 and history buffer 250 may operate in conjunction to replace the data corresponding to the first invalid packet with a replacement block.

As also shown in FIG. 7, the receiving device 230 may also conceal the loss of a second invalid packet corresponding to time period 720 by following steps of flow 400. For example, as described above with reference to steps 412, 430, 434, 436, 438, 418, 420, and 422, PLC circuit 240 and history buffer 250 may operate in conjunction to replace the data corresponding to the second consecutive invalid packet with a second replacement block. In addition, the output gain of decoder 260 may be ramped downward in response to detecting the invalidity of the second consecutive invalid packet. As shown in FIG. 7, the ramping down of the audio amplitude may occur according to the timing of envelope 739. In some embodiments, envelope 739 may be configured such that the ramp down of audio output signal 761 reaches an amplitude of zero before the end of time period 720, which corresponds to the time period of the second consecutive invalid packet. The ramp downward may thus provide a user friendly softening, as opposed to an abrupt stop, of the output of decoder 260 in the event that multiple consecutive packets are invalid. In some embodiments, the internal state of decoder 260 may be reset after decoding the second consecutive replacement block and further decoding may be bypassed until a valid packet is received.

Time period 730 may correspond to a third consecutive invalid packet. As described above with reference to steps 412, 430, 434, 440, and 422, PLC circuit 240 may, in response to a third consecutive invalid packet, provide a gain variable 242 to instruct decoder 260 to set the output gain of decoder 260 to zero. The output of decoder 260 may thus be zeroed out, without performing any decoding function, during time period 730. The output of decoder 260 may thereby be muted or continue to be muted during time period 730 and until a new valid packet is received and decoded.

Time period 740 may correspond to the time period of a first valid packet after three consecutive invalid packets. As described above with reference to steps 412, 414, and 442, PLC circuit 240 may ramp up the gain of decoder 260 in response to a valid packet following two or more previously received packets being invalid. For example, PLC circuit 240 may be configured to ramp up the gain of decoder 260 in response to detecting a valid packet following either of a second consecutive invalid packet or a third consecutive invalid packet. Moreover, the valid packet may be saved to history buffer 250 and also decoded by decoder 260 to generate audio output signal 761. The output gain may ramp upward such that audio output signal 761 transitions from zero to full amplitude within a ramp-up period 780. The ramp-up period 780 may provide for a user friendly ramp up, as opposed to an abrupt jump, of audio output signal 761. The ramp-up period 780 may be shorter than time period 740 corresponding to the first valid packet. The ramp-up period 780 may in some embodiments be, for example, 10, 5, 2, 1, or less milliseconds.

Figure 8:
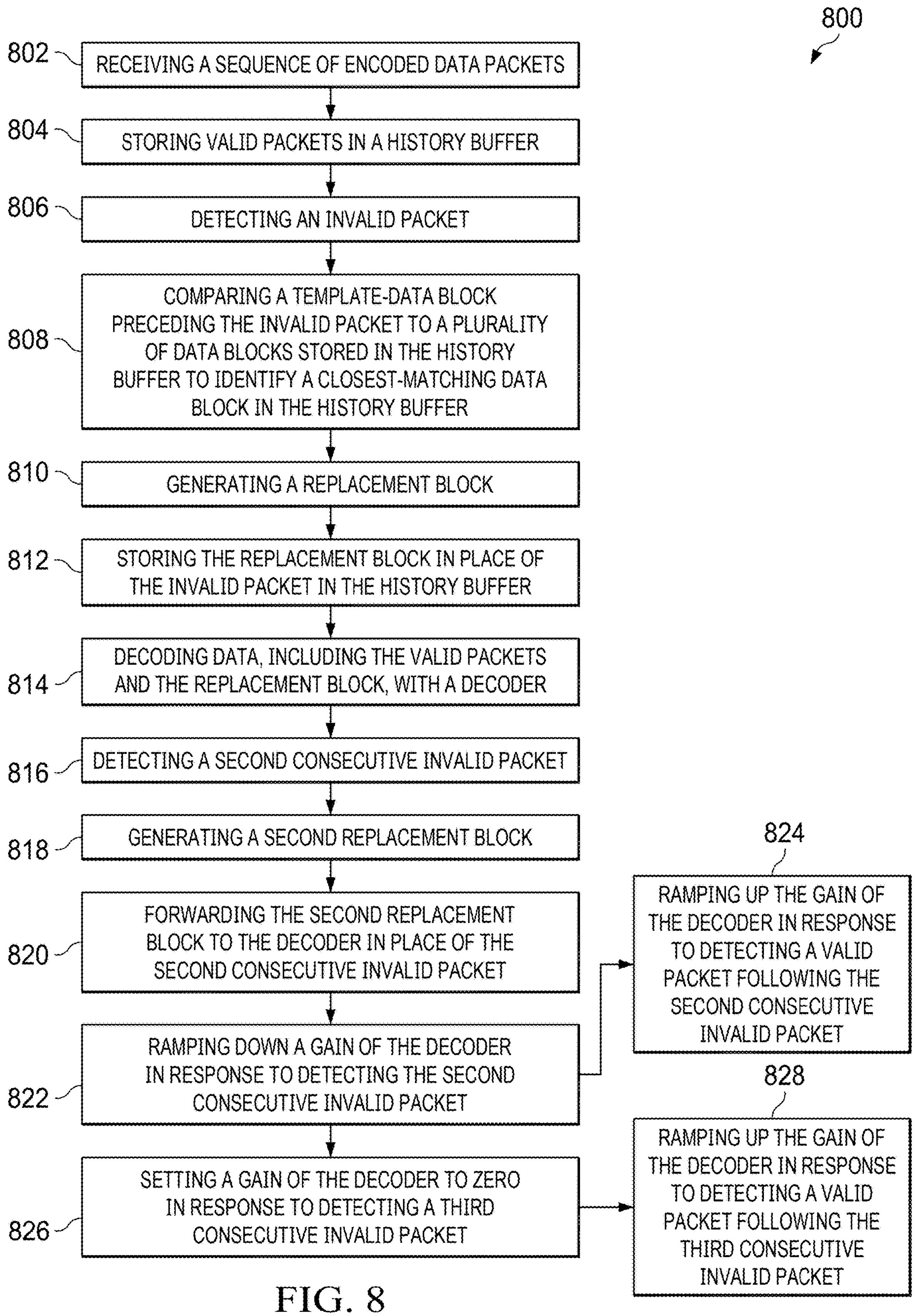
FIG. 8 illustrates operation of an example method for concealing packet loss in a communication system.

FIG. 8 illustrates operation of an example method 800 for concealing packet loss in a communication system. Method 800 may be performed by any suitable mechanism, such as the components of receiving device 230 described above with reference to FIG. 2, including PLC circuit 240, history buffer 250, and/or decoder 260, or any suitable combination thereof. In some embodiments, the steps of method 800 may be performed with fewer or more steps than shown in FIG. 8. Moreover, in some embodiments, certain steps of method 800 may be omitted, repeated, performed in parallel, performed in a different order than shown in FIG. 8, or performed recursively. Moreover, one or more steps of method 800, although shown in an order, may be performed at the same time or in a re-ordered manner. In some embodiments, and as described in detail below, certain steps of method 800 may include performance of one or more steps of flow 400, which is described above with reference to FIG. 4.

Step 802 may include receiving a sequence of encoded data packets. For example, as described above with reference to FIG. 2 and FIG. 4, PLC circuit 240 may be configured to receive a sequence of encoded data packets that may collectively form encoded audio data 221.

Step 804 may include storing valid packets from the sequence of encoded data packets in a history buffer. For example, as described above with reference to FIG. 2 and with reference to steps 412, 414, and 416 of flow 400 shown in FIG. 4, valid packets from a sequence of encoded data packets may be stored in history buffer 250. Specifically, PLC circuit 240 may be configured to store valid packets, from the sequence of encoded data packets, in history buffer 250.

Step 806 may include detecting an invalid packet in the sequence of encoded data packets. In some embodiments, PLC circuit 240 may be configured to detect an invalid packet in the sequence of encoded data packets that may collectively form encoded audio data 221. For example, as described above with reference to FIG. 2, and with reference to step 412 of flow 400 shown in FIG. 4, PLC circuit 240 may detect whether the new packet is valid or invalid based on a flag associated with the packet. For example, in embodiments where receiving device 230 is included in a Bluetooth application, PLC circuit 240, history buffer 250, and decoder 260 may reside in the Application Layer of the Bluetooth protocol stack. In such embodiments, PLC circuit 240 may receive a flag from lower layers of the Bluetooth protocol stack indicating the validity or invalidity of any packet passed to PLC circuit 240. Accordingly, PLC circuit 240 may detect the validity or invalidity of any received packet based on the status of the associated flag.

Step 808 may include comparing a template-data block preceding the invalid packet to a plurality of data blocks stored in the history buffer to identify a closest-matching data block in the history buffer. In some embodiments, PLC circuit 240 may be configured to compare a template-data block 502 preceding the invalid packet to a plurality of data blocks stored in the history buffer to identify a closest-matching data block 508 in history buffer 250. For example, as described above with reference to FIG. 5, and with reference to step 432 of flow 400 shown in FIG. 4, data preceding the invalid packet may be tabbed as template-data block 502. PLC circuit 240 may then compare template-data block 502 with data block 504 at the beginning of history buffer 250, as well as subsequent data blocks 506 representing audio data later in time in history buffer 250. The comparing is performed in the encoded domain using binary arithmetic. For example, in some embodiments, the comparing is performed with an XNOR function. After template-data block 502 is compared block-by-block to the data in history buffer 250, including data block 504 and subsequent data blocks 506, a closest-matching data block 508 may be identified. The closest-matching data block 508 may be the data block with the highest similarity metric of the data blocks in history buffer 250 to which the template-data block 502 is compared.

Step 810 may include generating a replacement block based on a first data block following the closest-matching data block. In some embodiments, PLC circuit 240 may be configured to generate a replacement block based on a first data block following the closest-matching data block. For example, as described above with reference to FIG. 5, and with reference to step 432 of flow 400 shown in FIG. 4, the first data block 510 following closest-matching data block 508 may be tabbed as the replacement data for the invalid packet. Thus, a replacement block may be generated by PLC circuit 240 based on the first data block 510 following the closest-matching data block 508.

Step 812 may include storing the replacement block in place of the invalid packet in the history buffer. For example, as described above with reference to step 416 of flow 400 shown in FIG. 4, PLC circuit 240 be configured to store the replacement block in the place of the invalid packet in history buffer 250.

Step 814 may include decoding data, including the valid packets and the replacement block, with a decoder. For example, as described above with reference to FIG. 2, decoder 260 may be configured to decode data, including valid packets and one or more replacement blocks, to thereby generate audio output signal 261.

Step 816 may include detecting a second consecutive invalid packet following the invalid packet in the sequence of encoded data packets. In some embodiments, PLC circuit 240 may be configured to detect a second consecutive invalid packet following the invalid packet in the sequence of encoded data packets. For example, as described above with reference to steps 412, 430, and 434 of flow 400 shown in FIG. 4, PLC circuit 240 may receive another new packet from within a sequence of encoded data packets forming encoded audio data 221. PLC circuit 240 may detect the invalidity of the newly received packet based on the status of an associated flag. PLC circuit 240 may also reference a validity log to determine whether the previously received packet was valid. Accordingly, PLC circuit 240 may detect whether the newly received packet is a second consecutive invalid packet following the invalid packet in the sequence of encoded data packets that may collectively form encoded audio data 221.

Step 818 may include generating a second replacement block based on a second data block following the first data block. In some embodiments, PLC circuit 240 may be configured to generate a second replacement block based on a second data block following the first data block. For example, as described above with reference FIG. 5 and with reference to step 436 of flow 400 shown in FIG. 4, the second data block 512 following first data block 510 may be tabbed as the replacement data for the second consecutive invalid packet. Subsequently, a second replacement block may be generated by PLC circuit 240 based on the second data block 512 following the first data block 510. For example, the second data block 512 may be copied to generate the second replacement block.

Step 820 may include forwarding the second replacement block to the decoder in place of the second consecutive invalid packet. In some embodiments, PLC circuit 240 may be configured to forward the second replacement block to the decoder in place of the second consecutive invalid packet. For example, as described above with reference FIG. 5 and with reference to step 436 of flow 400 shown in FIG. 4, the second replacement block may be forwarded by PLC circuit 240 to decoder 260 in place of the second consecutive invalid packet.

Step 822 may include ramping down a gain of the decoder in response to detecting the second consecutive invalid packet. In some embodiments, PLC circuit 240 may be configured to ramp down the gain of decoder 260 in response to detecting the second consecutive invalid packet. For example, as described above with reference to step 438 of flow 400 shown in FIG. 4, PLC circuit 240 may provide a gain variable 242 to instruct decoder 260 to ramp down its output gain based on the determination that multiple consecutive packets were invalid. After step 822, method 800 may proceed to either step 824 or step 826 depending on the validity or invalidity of the next received packet. If the next received packet is valid, method 800 may proceed to step 824. If the next received packet is invalid, method 800 may proceed to step 826.

Step 824 may include ramping up the gain of the decoder in response to detecting a valid packet following the second consecutive invalid packet. In some embodiments, PLC circuit 240 may be configured to ramp up the gain of decoder 260 in response to detecting a valid packet following the second consecutive invalid packet. For example, as described above with reference to step 442 of flow 400 shown in FIG. 4, PLC circuit 240 may provide a gain variable 242 to instruct decoder 260 to ramp up the gain of decoder 260 in response to PLC circuit 240 detecting a valid packet following multiple invalid packets.

Step 826 may include setting a gain of the decoder to zero in response to detecting a third consecutive invalid packet in the sequence of encoded data packets. In some embodiments, PLC circuit 240 may be configured to set a gain of the decoder to zero in response to detecting a third consecutive invalid packet in the sequence of encoded data packets. For example, as described above with reference to steps 412, 430, 434, and 440 of flow 400 shown in FIG. 4, PLC circuit 240 may receive another new packet from within a sequence of encoded data packets forming encoded audio data 221. PLC circuit 240 may detect the invalidity of the newly received packet based on the status of an associated flag. PLC circuit 240 may also reference a validity log to determine whether previously received packets were valid. Accordingly, PLC circuit 240 may detect whether the newly received packet is a third consecutive invalid packet in the sequence of encoded data packets that may collectively form encoded audio data 221. In response to detecting that the newly received packet is a third consecutive invalid packet, PLC circuit 240 may provide a gain variable 242 to instruct decoder 260 to decrease the output gain of decoder 260 to zero. The output of decoder 260 may thereby be muted.

Step 828 may include ramping up the gain of the decoder in response to detecting a valid packet following the third consecutive invalid packet. In some embodiments, PLC circuit 240 may be configured to ramp up the gain of decoder 260 in response to detecting a valid packet following the third consecutive invalid packet. For example, as described above with reference to step 442 of flow 400 shown in FIG. 4, PLC circuit 240 may provide a gain variable 242 to instruct decoder 260 to ramp up the gain of decoder 260 in response to PLC circuit 240 detecting a valid packet following multiple invalid packets.

Figure 9:
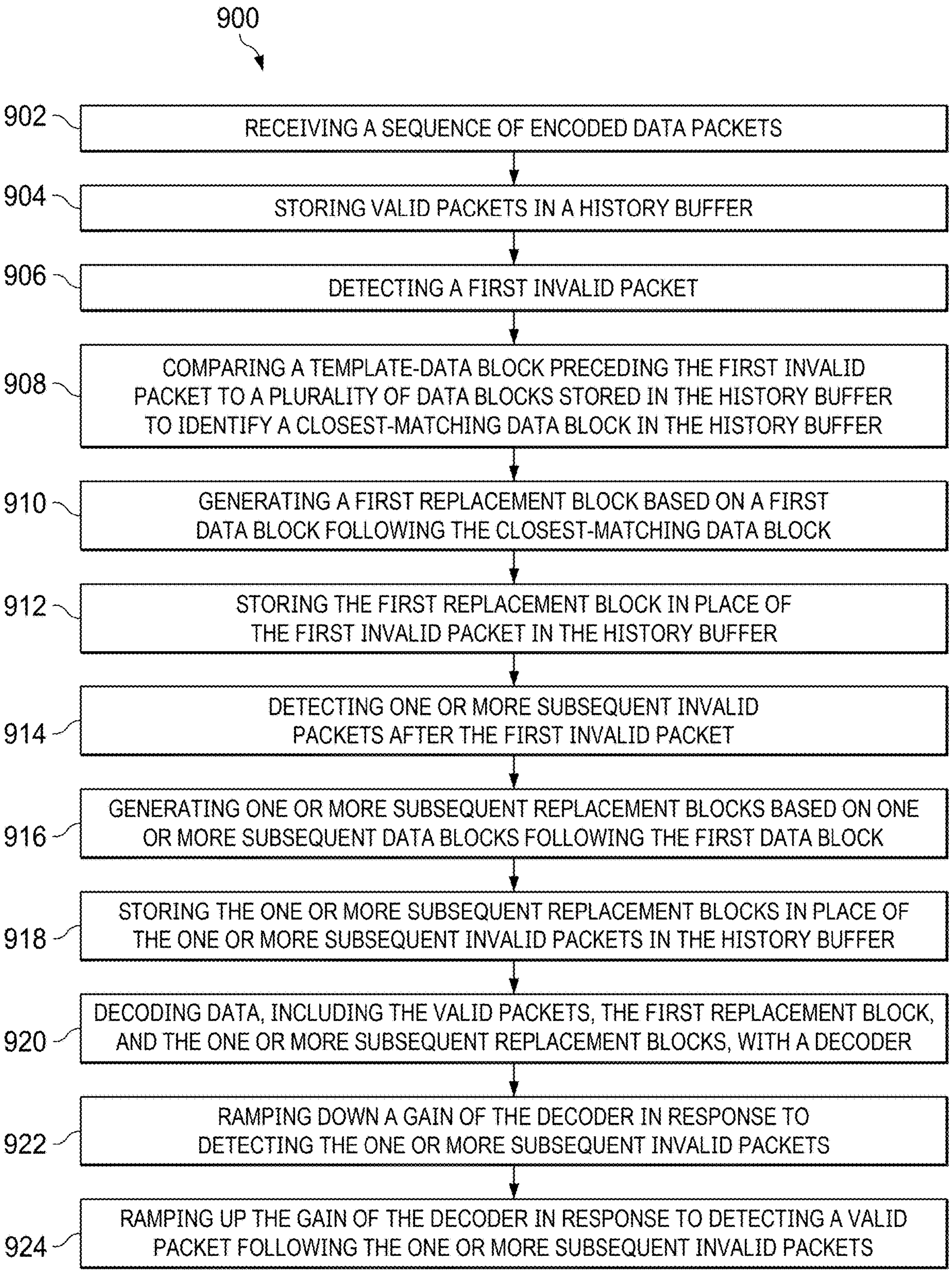
FIG. 9 illustrates operation of an example method for concealing packet loss in a communication system.

FIG. 9 illustrates operation of an example method 900 for concealing packet loss in a communication system. Method 900 may be performed by any suitable mechanism, such as the components of receiving device 230 described above with reference to FIG. 2, including PLC circuit 240, history buffer 250, and/or decoder 260, or any suitable combination thereof. In some embodiments, the steps of method 900 may be performed with fewer or more steps than shown in FIG. 9. Moreover, in some embodiments, certain steps of method 900 may be omitted, repeated, performed in parallel, performed in a different order than shown in FIG. 9, or performed recursively. Moreover, one or more steps of method 900, although shown in an order, may be performed at the same time or in a re-ordered manner. In some embodiments, and as described in detail below, certain steps of method 900 may include performance of one or more steps of flow 400, which is described above with reference to FIG. 4.

Step 902 may include receiving a sequence of encoded data packets. For example, as described above with reference to FIG. 2 and FIG. 4, PLC circuit 240 may be configured to receive a sequence of encoded data packets that may collectively form encoded audio data 221.

Step 904 may include storing valid packets from the sequence of encoded data packets in a history buffer. For example, as described above with reference to FIG. 2 and with reference to steps 412, 414, and 416 of flow 400 shown in FIG. 4, valid packets from a sequence of encoded data packets may be stored in history buffer 250. Specifically, PLC circuit 240 may be configured to store valid packets, from the sequence of encoded data packets, in history buffer 250.

Step 906 may include detecting a first invalid packet in the sequence of encoded data packets. In some embodiments, PLC circuit 240 may be configured to detect an invalid packet in the sequence of encoded data packets that may collectively form encoded audio data 221. For example, as described above with reference to FIG. 2, and with reference to step 412 of flow 400 shown in FIG. 4, PLC circuit 240 may detect whether the new packet is valid or invalid based on a flag associated with the packet. For example, in embodiments where receiving device 230 is included in a Bluetooth application, PLC circuit 240, history buffer 250, and decoder 260 may reside in the Application Layer of the Bluetooth protocol stack. In such embodiments, PLC circuit 240 may receive a flag from lower layers of the Bluetooth protocol stack indicating the validity or invalidity of any packet passed to PLC circuit 240. Accordingly, PLC circuit 240 may detect the validity or invalidity of any received packet based on the status of the associated flag.

Step 908 may include comparing a template-data block preceding the first invalid packet to a plurality of data blocks stored in the history buffer to identify a closest-matching data block in the history buffer. For example, as described above with reference to FIG. 5, and with reference to step 432 of flow 400 shown in FIG. 4, data preceding the first invalid packet may be tabbed as template-data block 502. PLC circuit 240 may then compare template-data block 502 with data block 504 at the beginning of history buffer 250, as well as subsequent data blocks 506 representing audio data later in time in history buffer 250. The comparing is performed in the encoded domain using binary arithmetic. For example, in some embodiments, the comparing is performed with an XNOR function. After template-data block 502 is compared block-by-block to the data in history buffer 250, including data block 504 and subsequent data blocks 506, a closest-matching data block 508 may be identified. The closest-matching data block 508 may be the data block with the highest similarity metric of the data blocks in history buffer 250 to which the template-data block 502 is compared.

Step 910 may include generating a first replacement block based on a first data block following the closest-matching data block. For example, as described above with reference to FIG. 5, and with reference to step 432 of flow 400 shown in FIG. 4, the first data block 510 following closest-matching data block 508 may be tabbed as the replacement data for the first invalid packet. Thus, a first replacement block may be generated by PLC circuit 240 based on the first data block 510 following the closest-matching data block 508.

Step 912 may include storing the first replacement block in place of the first invalid packet in the history buffer. For example, as described above with reference to step 416 of flow 400 shown in FIG. 4, PLC circuit 240 be configured to store the first replacement block in the place of the first invalid packet in history buffer 250.

Step 914 may include detecting one or more subsequent invalid packets after the first invalid packet in the sequence of encoded data packets. For example, as described above with reference to steps 412, 430, and 434 of flow 400 shown in FIG. 4, as PLC circuit 240 receives new packets from within a sequence of encoded data packets forming encoded audio data 221, PLC circuit 240 may detect the invalidity of the newly received packets based on the status of a flag associated with each respective packet. PLC circuit 240 may also reference a validity log to determine whether the previously received packets were valid. Accordingly, PLC circuit 240 may detect whether one or more packets received subsequent to the first invalid packet are also invalid.

Step 916 may include generating one or more subsequent replacement blocks based on one or more subsequent data blocks following the first data block.

In some embodiments, one or more subsequent replacement blocks may be generated based on data in history buffer 250 following first data block 510. For example, as described above with reference FIG. 5 and with reference to step 436 of flow 400 shown in FIG. 4, the second data block 512 following first data block 510 may be tabbed as the replacement data for the second consecutive invalid packet after the first invalid packet, and a second replacement block (which may also be referred to as a subsequent replacement block) may be generated by PLC circuit 240 based on the second data block 512 following the first data block 510. A similar procedure may be followed for further consecutive invalid packets. For example, a third, fourth, through Nth number of data blocks following second data block 512 may be tabbed as the replacement data for third, fourth, through Nth number of consecutive invalid packets following the first invalid packet and the second consecutive invalid packet. Subsequently, third, fourth, through Nth number of subsequent replacement blocks may be generated by PLC circuit 240 based on the replacement data for the third, fourth, through Nth number of consecutive invalid packets.

In other embodiments, one or more subsequent replacement blocks may also be generated by repeating the bit-pattern matching procedure described above with reference to steps 432 and 416 of flow 400 in FIG. 4. For example, in such other embodiments, flow 400 may be modified such that any number of one or more invalid packets after a first invalid packet are processed using the bit-pattern matching procedure described above with reference to steps 432 and 416 of flow 400 in FIG. 4. In such embodiments, as the replacement data identified by the bit-pattern matching procedure continues to be written to history buffer 250 in place of each consecutive invalid packet, the one or more subsequent replacement blocks may be generated using that data in history buffer 250 following first data block 510.

Step 918 may include storing the one or more subsequent replacement blocks in place of the one or more invalid packets in the history buffer. For example, as one or more subsequent replacement blocks are generated according to any of the embodiments described above for step 916, PLC circuit 240 may be configured to store those one or more subsequent replacement blocks in the place of the respective one or more subsequent invalid packets in history buffer 250.

Step 920 may include decoding data, including the valid packets, the first replacement block, and the one or more subsequent replacement blocks, with a decoder. For example, as described above with reference to FIG. 2, decoder 260 may be configured to decode data, including valid packets and any replacement blocks forwarded by PLC circuit 240, to thereby generate audio output signal 261.

Step 922 may include ramping down a gain of the decoder in response to detecting the one or more subsequent invalid packets. For example, as described above with reference to FIG. 2 and to step 438 of flow 400 shown in FIG. 4, PLC circuit 240 may provide a gain variable 242 to instruct decoder 260 to ramp down its output gain based on the determination that multiple consecutive packets were invalid. In some embodiments, the ramp down may occur according to flow 400 in response to a second consecutive invalid packet. In other embodiments, flow 400 may be modified such that the ramp down occurs after 3, 4, or any selected, programmed, or pre-pre-programmed number of consecutive invalid packets.

Step 924 may include ramping up the gain of the decoder in response to detecting a valid packet following the one or more subsequent invalid packets. For example, as described above with reference to step 442 of flow 400 shown in FIG. 4, PLC circuit 240 may provide a gain variable 242 to instruct decoder 260 to ramp up the gain of decoder 260 in response to PLC circuit 240 detecting a valid packet following multiple invalid packets.

Although examples have been described above, other modifications and variations may be made from this disclosure without departing from the spirit and scope of these examples. The above descriptions of various embodiments illustrate the principles of the invention. Numerous variations and modifications will become apparent to those skilled in the art based on the above disclosure. The following claims are intended to embrace all such variations and modifications.

What is claimed is:

1. A method comprising:

receiving a sequence of encoded data packets;

storing valid packets from the sequence of encoded data packets in a history buffer;

detecting an invalid packet in the sequence of encoded data packets;

comparing a template-data block preceding the invalid packet to a plurality of data blocks stored in the history buffer to identify a closest-matching data block in the history buffer;

generating a replacement block based on a first data block following the closest-matching data block;

decoding data, including the valid packets and the replacement block, with a decoder;

detecting a second consecutive invalid packet following the invalid packet in the sequence of encoded data packets;

generating a second replacement block based on a second data block following the first data block; and forwarding the second replacement block to the decoder in place of the second consecutive invalid packet.

2. The method of claim 1, further comprising storing the replacement block in place of the invalid packet in the history buffer.

3. The method of claim 1, wherein:

the decoder is a CVSD decoder; and an internal state of the CVSD decoder is updated based on the valid packets and the replacement block.

4. The method of claim 1, further comprising ramping down a gain of the decoder in response to detecting the second consecutive invalid packet.

5. The method of claim 4, further comprising ramping up the gain of the decoder in response to detecting a valid packet following the second consecutive invalid packet.

6. The method of claim 1, further comprising:

setting a gain of the decoder to zero in response to detecting a third consecutive invalid packet in the sequence of encoded data packets; and ramping up the gain of the decoder in response to detecting a valid packet following the third consecutive invalid packet.

7. The method of claim 1, wherein the comparing is performed in an encoded domain using binary arithmetic.

8. The method of claim 1, further comprising writing the replacement block to the history buffer.

9. A hearing aid comprising:

a packet-loss concealment (PLC) circuit coupled to a history buffer, the PLC circuit configured to:

receive a sequence of encoded data packets;

store valid packets from the sequence of encoded data packets in the history buffer;

detect an invalid packet in the sequence of encoded data packets;

compare a template-data block preceding the invalid packet to a plurality of data blocks stored in the history buffer to identify a closest-matching data block in the history buffer; and generate a replacement block based on a first data block following the closest-matching data block; and a decoder coupled to the PLC circuit and configured to decode data including the valid packets and the replacement block; and wherein the PLC circuit is further configured to:

detect a second consecutive invalid packet following the invalid packet in the sequence of encoded data packets;

generate a second replacement block based on a second data block following the first data block; and forward the second replacement block to the decoder in place of the second consecutive invalid packet.

10. The hearing aid of claim 9, wherein the PLC circuit is further configured to store the replacement block in place of the invalid packet in the history buffer.

11. The hearing aid of claim 9, wherein:

the decoder is a CVSD decoder; and the CVSD decoder is configured to update an internal state of the CVSD decoder based on the valid packets and the replacement block.

12. The hearing aid of claim 9, wherein the PLC circuit is further configured to ramp down a gain of the decoder in response to detecting the second consecutive invalid packet.

13. The hearing aid of claim 12, wherein the PLC circuit is further configured to ramp up the gain of the decoder in response to detecting a valid packet following the second consecutive invalid packet.

14. The hearing aid of claim 9, wherein the PLC circuit is further configured to:

set a gain of the decoder to zero in response to detecting a third consecutive invalid packet in the sequence of encoded data packets; and ramp up the gain of the decoder in response to detecting a valid packet following the third consecutive invalid packet.

15. The hearing aid of claim 9, wherein the PLC circuit is configured to compare the template-data block to the plurality of data blocks stored in the history buffer in an encoded domain using binary arithmetic.

16. The hearing aid of claim 9, wherein the PLC circuit is further configured to write the replacement block to the history buffer.

17. A method comprising:

receiving a sequence of encoded data packets;

storing valid packets from the sequence of encoded data packets in a history buffer;

detecting a first invalid packet in the sequence of encoded data packets;

comparing a template-data block preceding the first invalid packet to a plurality of data blocks stored in the history buffer to identify a closest-matching data block in the history buffer;

generating a first replacement block based on a first data block following the closest-matching data block;

detecting one or more subsequent invalid packets after the first invalid packet in the sequence of encoded data packets;

generating one or more subsequent replacement blocks based on one or more subsequent data blocks following the first data block;

decoding data, including the valid packets, the first replacement block, and the one or more subsequent replacement blocks, with a decoder;

ramping down a gain of the decoder in response to detecting the one or more subsequent invalid packets; and ramping up the gain of the decoder in response to detecting a valid packet following the one or more subsequent invalid packets.

18. The method of claim 17, further comprising storing the first replacement block in place of the first invalid packet in the history buffer.

19. The method of claim 18, further comprising storing the one or more subsequent replacement blocks in place of the one or more subsequent invalid packets in the history buffer.

20. The method of claim 17, wherein the one or more subsequent invalid packets after the first invalid packet are consecutive to the first invalid packet.

* * * * *